(12) United States Patent
Kondikoppad et al.

(10) Patent No.: US 11,712,936 B2
(45) Date of Patent: Aug. 1, 2023

(54) SYSTEM FOR HOLDING AND STORING DISCONNECTED LINES

(71) Applicant: Volvo Truck Corporation, Gothenburg (SE)

(72) Inventors: Ravi Kondikoppad, Bengaluru (IN); Umesh Basavaraj Hamasagar, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 218 days.

(21) Appl. No.: 17/194,671

(22) Filed: Mar. 8, 2021

(65) Prior Publication Data

US 2021/0276382 A1    Sep. 9, 2021

(30) Foreign Application Priority Data

Mar. 9, 2020  (IN) .............................. 202041010042

(51) Int. Cl.
  *B60D 1/62*        (2006.01)
(52) U.S. Cl.
  CPC ..................... *B60D 1/62* (2013.01)
(58) Field of Classification Search
  CPC .... B60D 1/58; B60D 1/62; B60D 1/64; B60R 11/00; B60R 16/02; B60R 16/0207; B60R 16/0215
  See application file for complete search history.

(56) References Cited

U.S. PATENT DOCUMENTS 3,650,545 A * 3/1972 Freed .................. B60D 1/62
                                              280/421
6,089,907 A   7/2000 Shoblom
(Continued)

FOREIGN PATENT DOCUMENTS

| EP | 2508056 A1 | 10/2012 |
| JP | H1179005 A | 3/1999 |
| SE | 533661 C2 | 11/2010 |

OTHER PUBLICATIONS

Extended European Search Report for European Patent Application No. 21158990.8, dated Jul. 20, 2021, 5 pages.
(Continued)

*Primary Examiner* — Kevin Hurley
*Assistant Examiner* — Maurice L Williams
(74) *Attorney, Agent, or Firm* — Withrow & Terranova, PLLC

(57) ABSTRACT

System for holding and storing disconnected lines of a tractor unit, each line comprising, at one end, a coupling configured to be coupled to a complementary coupling of a trailer so as to pneumatically or electrically connect the trailer to the tractor unit, the system for holding and storing comprising a first retaining mechanism comprising a bracket designed to be fixed on a rear wall of the tractor unit and at least one spring having a first extremity attached to the bracket and a second extremity on which at least one of the lines can be hung; and a second retaining mechanism for receiving and holding the couplings arranged at the end of the lines; the system for holding and storing further including a magnetic stabilizer configured for attracting and maintaining the spring in a rest position when the tractor unit is moving without trailer.

18 Claims, 4 Drawing Sheets

(56) References Cited

U.S. PATENT DOCUMENTS

Figure 1:
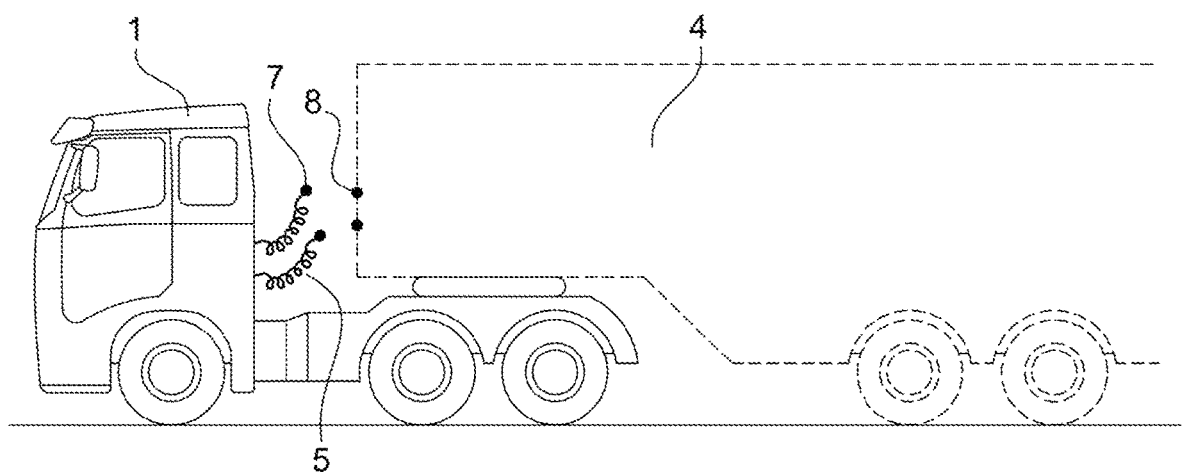

| | | | | |
|---|---|---|---|---|
| 7,086,659 B2* | 8/2006 | Baginski | | B60D 1/62 |
| | | | | 248/58 |
| 8,408,501 B2* | 4/2013 | Noyes | | F16L 3/22 |
| | | | | 248/68.1 |
| 10,096,934 B1* | 10/2018 | Desjardins | | H01R 13/5841 |
| 10,428,974 B2* | 10/2019 | Krohn | | F16L 3/2235 |
| 10,570,941 B2* | 2/2020 | Isaji | | F16B 2/22 |
| 10,661,622 B2* | 5/2020 | Keatley | | F04B 35/04 |
| 10,953,824 B2* | 3/2021 | Nakaizumi | | F16B 2/08 |
| 11,085,555 B2* | 8/2021 | Getts | | B60D 1/58 |
| 11,099,560 B2* | 8/2021 | Smith | | B60D 1/26 |
| 11,148,619 B2* | 10/2021 | Takata | | H01B 7/2825 |
| 11,179,986 B2* | 11/2021 | Papafagos | | B60R 16/08 |
| 11,222,736 B2* | 1/2022 | Omae | | H01B 7/0045 |
| 11,267,414 B2* | 3/2022 | Marcolongo | | F16L 3/1033 |
| 2004/0164516 A1* | 8/2004 | Baginski | | B60D 1/62 |
| | | | | 280/420 |
| 2005/0236807 A1* | 10/2005 | Baginski | | B60D 1/62 |
| | | | | 280/420 |
| 2010/0026029 A1 | 2/2010 | Easling | | |
| 2013/0320156 A1 | 12/2013 | Waldner et al. | | |
| 2016/0047494 A1* | 2/2016 | Dickinson | | F16L 3/13 |
| | | | | 248/74.1 |
| 2017/0338004 A1* | 11/2017 | Yanazawa | | H02G 3/0487 |
| 2018/0187798 A1* | 7/2018 | Kanie | | B60R 16/08 |
| 2018/0372245 A1 | 12/2018 | Peterson | | |
| 2020/0017038 A1* | 1/2020 | Pay | | H02G 3/0487 |
| 2021/0053407 A1* | 2/2021 | Smith | | B25J 9/1697 |
| 2021/0057128 A1* | 2/2021 | Takata | | H01B 7/2825 |
| 2021/0227104 A1* | 7/2021 | Krishnan | | G07C 9/00896 |

OTHER PUBLICATIONS

Examination Report for Indian Patent Application No. 202041010042, dated Feb. 1, 2022, 6 pages.

* cited by examiner

SYSTEM FOR HOLDING AND STORING DISCONNECTED LINES

RELATED APPLICATIONS

This application claims priority to Indian patent application serial number IN 202041010042, filed Mar. 9, 2020, the disclosure of which is hereby incorporated herein by reference in its entirety.

FIELD OF THE DISCLOSURE

The present disclosure relates to a system for holding and storing disconnected lines of a tractor unit.

BACKGROUND

In the heavy-duty vehicles industry, it is well known that trailers have their own braking system. This braking system is usually powered by the tractor unit, meaning that when a trailer is mechanically attached at the back of the tractor unit, it is needed to electrically and/or pneumatically connect the trailer to the tractor unit as well. To this end, the tractor unit includes a plurality of lines (pneumatic and/or electric) to be connected to the trailer, in order to transfer pneumatic energy and/or electrical energy from the tractor unit to the trailer.

Precisely, the trailer includes connection ports to which the driver can connect the connecting lines of the tractor unit. In this respect, a coupling (or connector) is provided at the end of each connecting line. Typically, glad-hand couplings are used to connect pneumatic lines.

Generally, the tractor unit is provided with at least two lines, namely one pneumatic line to transfer pneumatic energy and one electric line (or cable) to transfer electrical energy.

When no trailer is attached at the back of the tractor unit, the connecting lines (to the trailer) are generally suspended from a bracket attached to the Back of the Cabin (BoC), such as a horizontal bar. Typically, the lines are suspended from the bracket by means of one or more springs, as described in US 2013/320156 A. In addition, the couplings provided at the end of the lines are kept stationary against the back of the cabin thanks to a holding device, or holder.

The combination of the springs and holder enables to maintain the first lines immobile while the truck is moving.

However, it has been reported that springs and lines hit the Back of the Cabin while the truck is moving, causing paint peel off and impacts on the back of the cabin. This further causes noise inside the cab, which disturbs the driver. This is especially true when the truck is moving on an incline or off-road.

The present invention aims to solve the disadvantages mentioned above.

SUMMARY

For this purpose, the present invention relates to a system for holding and storing disconnected lines of a tractor unit according to the subject matter of claim 1.

This arrangement allows maintaining the at least one spring in the rest position as the tractor unit is driving without being connected to a trailer. Even if the road presents an uneven surface, the magnetic stabilizer prevents the moves of the at least one spring to protect the rear wall of the tractor unit against the knocking of the second extremity of the at least one spring.

In a coupled configuration, that is to say when the tractor unit is connected to a trailer, the at least one spring is extended to enable the extension of the lines.

By uncoupled configuration, it is therefore meant that the lines are disconnected from the trailer. In that case, the lines have to be maintained near the rear wall of the tractor unit so that the tractor unit can be driven independently.

According to an aspect of the invention, the at least one second extremity is distant from the rear wall in the uncoupled configuration. According to an aspect of the invention, the at least one spring is at least partially made of steel.

According to an aspect of the invention, the magnetic stabilizer comprises a body having at least one recess configured to receive a portion of a corresponding spring in the rest position.

Not only is the at least one spring attracted by the magnetic stabilizer in uncoupled configuration, but also the at least one corresponding recess defines precisely the rest position. Thus, when changing from the coupled configuration to the uncoupled configuration, the at least one spring is attracted to be maintained received in the corresponding at least one recess.

According to an aspect of the invention, the magnetic stabilizer is made in one piece or comprises several independent units, each being provided with at least one recess.

According to an aspect of the invention, the recess is an axial groove is configured to prevent lateral displacement of the corresponding spring in the rest position.

The term "lateral" is to be understood with respect to the longitudinal direction. As the or each spring is attracted towards the magnetic stabilizer and blocked laterally, there is a reliable position maintaining in rest position even if the tractor unit is driving on a difficult road.

According to an aspect of the invention, when there are several axial grooves, the axial grooves are aligned transversally to the longitudinal direction. This enables to arrange the springs distantly and aligned transversally to the longitudinal direction.

According to an aspect of the invention, the magnetic stabilizer is configured to be attached on the rear wall of the tractor unit, the magnetic stabilizer being located between the rear wall and the at least one spring transversally to the rear wall in the uncoupled configuration.

This provision allows keeping the plurality of lines near the rear wall in the uncoupled configuration while protecting the rear wall from knockings of the second extremity of the at least one spring.

According to an aspect of the invention, the second extremity comprises a hooking element to be attached around at least one line.

According to a possibility, the clamping element is configured to enable the extension of the at least one corresponding spring in the coupled configuration.

The at least one spring is configured to be at least partially extended in coupled configuration which prevents the second extremity to knock on the rear wall.

According to an aspect of the invention, the or each hooking element is configured to cooperate with a plurality of lines.

The lines are managed together as a bundle by the at least one second extremity. This enables to manage the plurality of lines with a limited amount of springs, preferably less than the amount of lines.

According to an aspect of the invention, the bracket comprises a bar on which the at least one spring is hinged so as to freely move along the bar.

As to each spring corresponds a recess, there is no need to fix each first extremity in the uncoupled configuration. According an aspect of the invention, the or each first extremity comprises a ring or hook configured to be secured on the bar.

According to an aspect of the invention, the second retaining mechanism comprises a plurality of holders configured to be attached on the rear wall, each holder being configured to receive a coupling of a corresponding line.

Each holder is configured to secure the corresponding coupling in the uncoupled configuration.

According to an aspect of the invention, the plurality of lines comprise at least one, and in particular two, pneumatic hoses. The or each pneumatic hose has a coupling that is a glad hand.

According to an aspect of the invention, the magnetic stabilizer comprises an electro-magnet that can be manually or automatically switched on.

According to an aspect of the invention, the system for holding and storing further includes at least one proximity sensor to detect whether the couplings are in a stored configuration in which they are held by the second retaining mechanism and in that the electro-magnet is turned on only when the couplings are in said stored configuration.

This use of an electro-magnet, which could be manual or automatically switched, enables to remove the magnetic constraints on the at least one spring in the coupled configuration. Preferably, the electro-magnet comprises a coil configured to be fed by the tractor unit, in particular from a battery or an auxiliary device located in the tractor unit.

According to an aspect of the invention, the proximity sensor or alternatively an open circuit detection device is configured to sense the couplings positioned in stored configuration.

According to an aspect of the invention, the magnetic stabilizer comprises an external shell. Preferably, the external shell is made of plastic and in particular of PA66. The coil is housed in said external shell.

According to an aspect of the invention, the magnetic stabilizer comprises a permanent magnet.

According to this possibility, there is no need to have an electrical feeding for the magnetic stabilizer, which simplifies the construction of the system for holding and storing.

According to an aspect of the invention, each line comprises an inlet connector at an extremity opposed to the extremity comprising the corresponding coupling, the inlet connectors being configured to be plugged on a dedicated feeding connector assembly of the tractor unit, the holders being located between said feeding connector assembly and the at least one second extremity so that the lines are arranged according to a looped trajectory in the uncoupled configuration.

Preferably, the looped trajectory is extending according to a plane sensibly parallel to the rear wall of the tractor unit. This enable to have the lines parked on the back of the tractor unit near the rear wall in the uncoupled configuration.

The present invention also concerns a tractor unit comprising a system for holding and storing disconnected lines. Preferably, the tractor unit comprises the lines.

The different aspects defined above that are not incompatible can be combined. Further advantages and advantageous features of the invention are disclosed in the following description and in the dependent claims.

BRIEF DESCRIPTION OF THE DRAWING FIGURES

With reference to the appended drawings, below follows a more detailed description of embodiments of the invention cited as examples.

Figure 2:
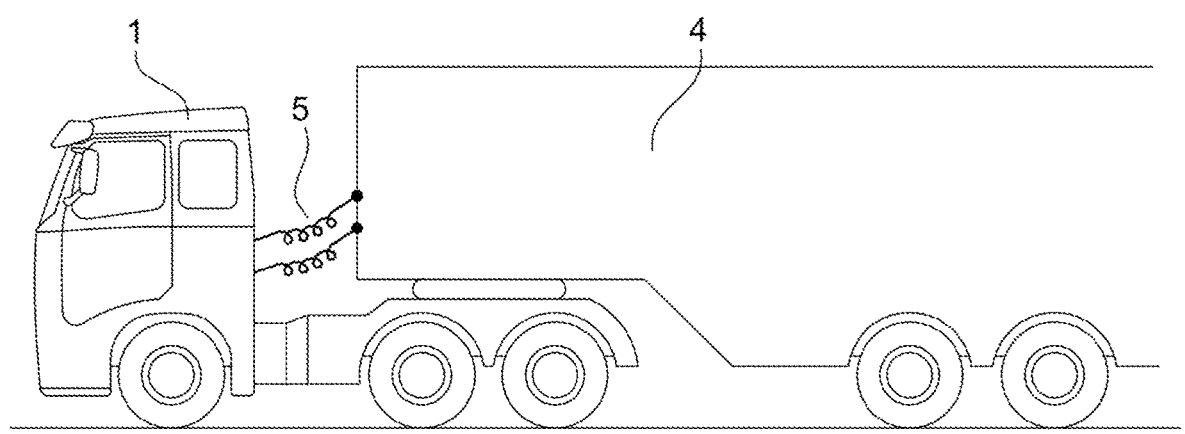
Figure 3:
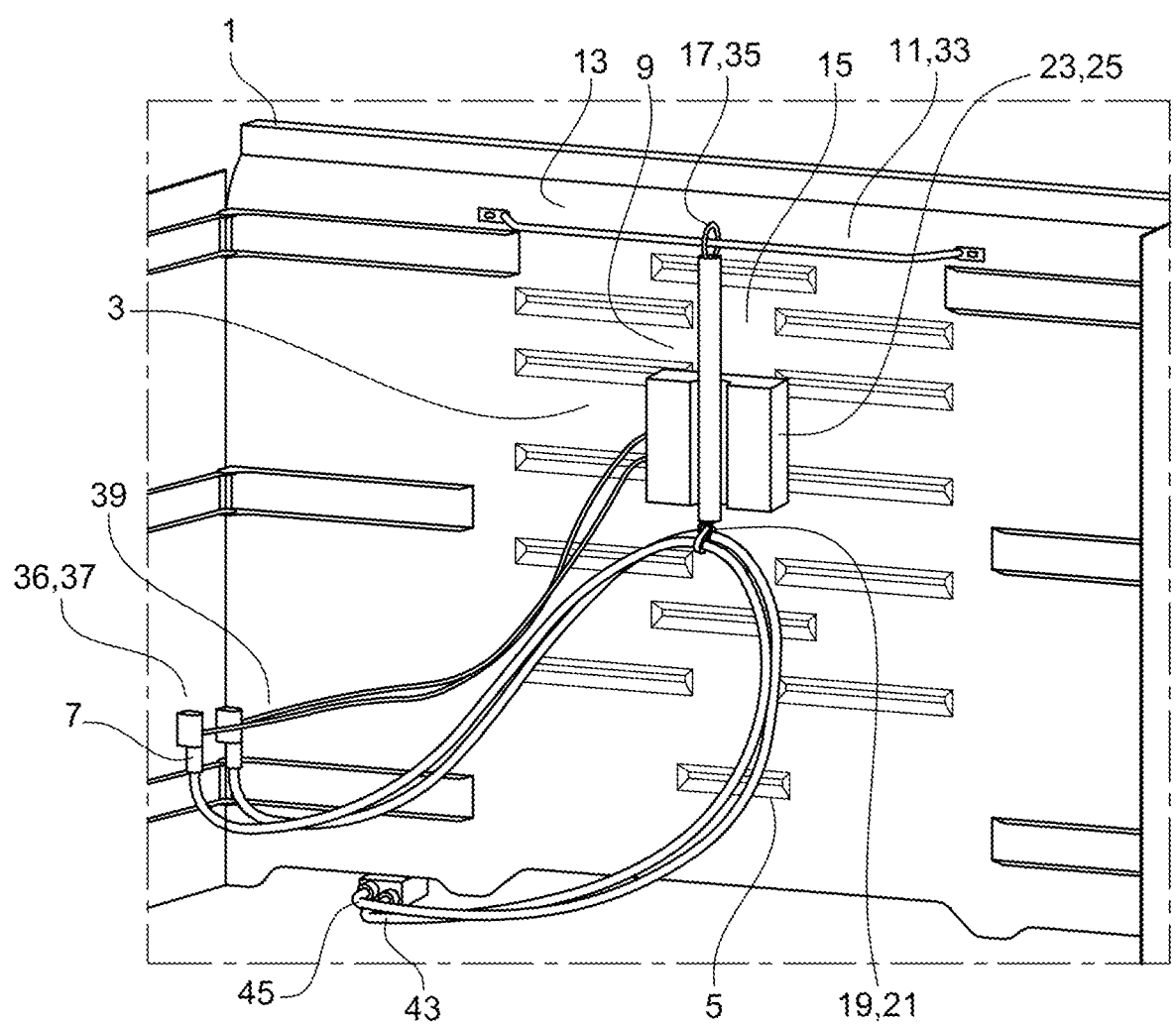
Figure 4:
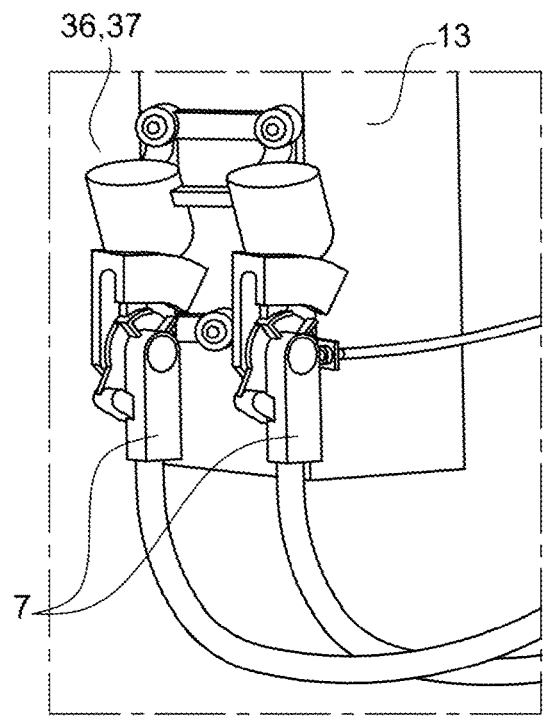
Figure 5:
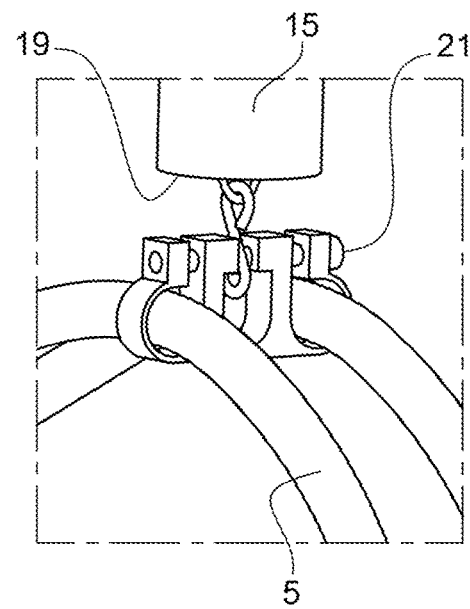
Figure 6:
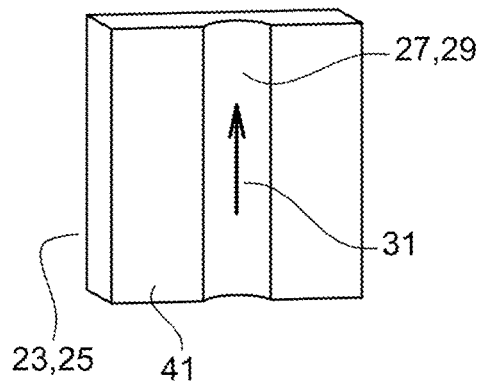
Figure 7:
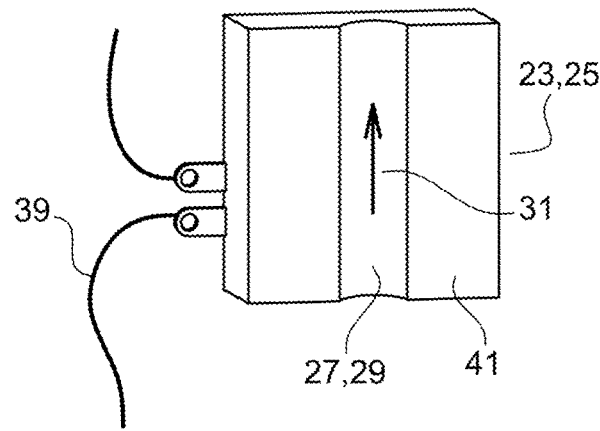
Figure 8:
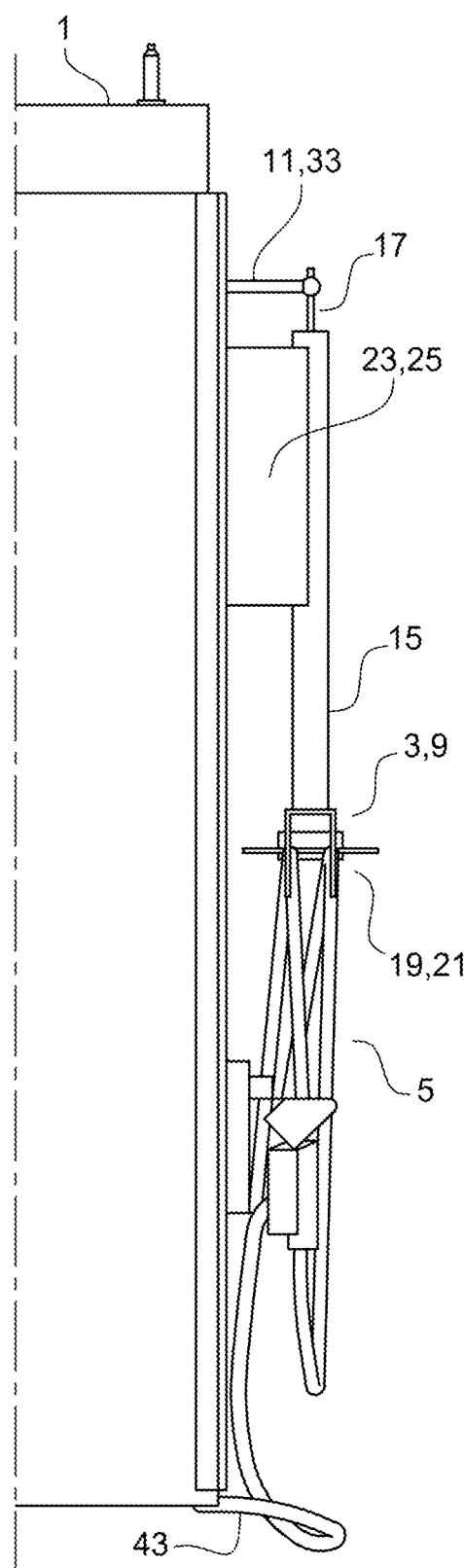
Figure 9:
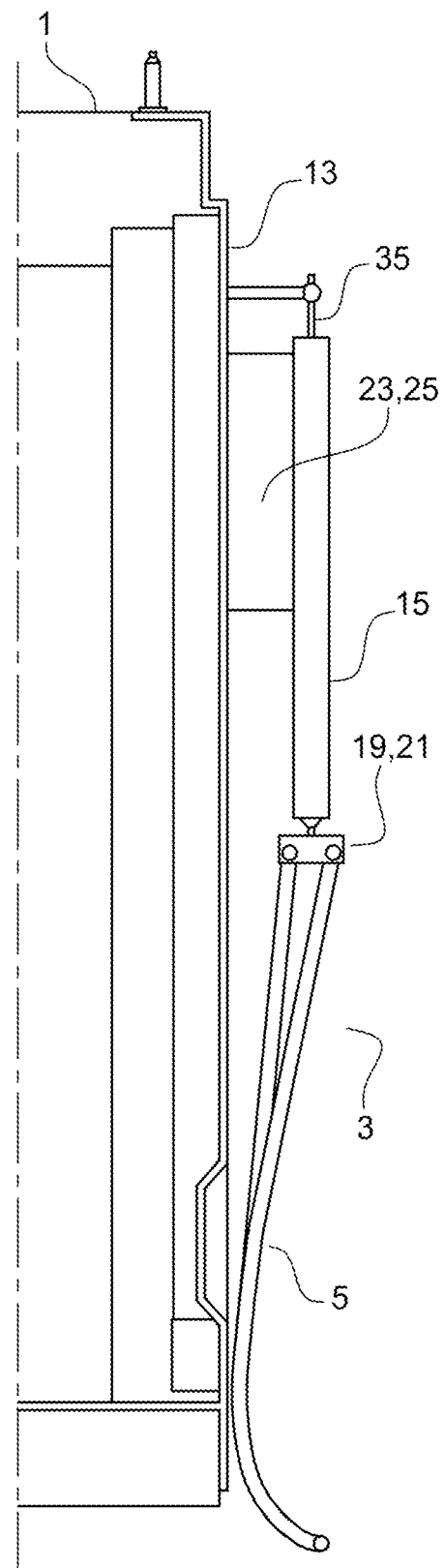

In the drawings:

FIG. 1 is a side view of a tractor unit and a trailer in an uncoupled configuration, FIG. 2 a side view of the tractor unit and the trailer in a coupled configuration, FIG. 3 is a perspective view of a rear wall of the tractor unit on which is attached a system for holding and storing, FIG. 4 is a perspective view of couplings of lines designed to connect the tractor unit and the trailer, the couplings cooperating with holders attached on the rear wall, FIG. 5 is a perspective view of a spring and a hooking element for maintaining the lines, FIG. 6 is a perspective view of a magnetic stabilizer according to a first variant, FIG. 7 is a perspective view of a magnetic stabilizer according to a second variant, FIG. 8 is a side view of the system for holding and storing in an uncoupled configuration, FIG. 9 is a side view of the system for holding and storing in a coupled configuration.

DETAILED DESCRIPTION

In the following detailed description of the figures defined above, the same elements or the elements that are fulfilling identical functions may retain the same references so as to simplify the understanding of the invention.

As illustrated in FIGS. 1 to 3, a tractor unit 1 comprises a system for holding and storing 3 configured to pneumatically and/or electrically connect a braking system of a trailer 4 to the tractor unit 1 in a coupled configuration.

A plurality of lines 5 for pneumatic and/or electrical feeding are provided, each comprising a coupling 7 configured to cooperate with a complementary coupling 8 of the braking system in the coupled configuration.

Thus, the lines 5 are either disconnected from the trailer 4 in the uncoupled configuration or coupled to the trailer 4 in the coupled configuration.

As illustrated in FIGS. 3 to 9, the system for holding and storing 3 comprises a first retaining mechanism 9 provided with a bracket 11 arranged to be fixed on a rear wall 13 of the tractor unit 1 and provided with a spring 15, said spring 15 being a tension spring and having a first extremity 17 attached to the bracket 11 and a second extremity 19 cooperating with at least one of the plurality of lines 5.

The second extremity 19 comprises a hooking element 21 configured for cooperating with a section of at least one line 5 so as to enable the movement and the extension of the spring 15 in the coupled configuration.

The spring 15 is configured to be at least partially extended in coupled configuration to prevent the second extremity 19 to knock on the rear wall 13.

In the embodiment of FIG. 3, the hooking element 21 is configured to cooperate with the plurality of the lines 5.

The system for holding and storing 3 comprises a magnetic stabilizer 23 configured for attracting and maintaining in a rest position the spring 15 when the trailer 4 and the tractor unit 1 are in an uncoupled configuration. The spring 15 is at least partially made of steel.

By uncoupled configuration, it is therefore meant that the lines 5 are disconnected from the trailer 4. In that case, the lines 5 have to be maintained near the rear wall 13 of the tractor unit 1 so that the tractor unit can be driven independently.

The second extremity 19 is distant from the rear wall 13 in the uncoupled configuration.

The magnetic stabilizer 23 comprises a unique independent unit 25 or body that is provided with a recess 27 as shown in FIGS. 6 and 7. In FIG. 3, only one unit is represented.

The magnetic stabilizer 23 is configured to be attached on the rear wall 13 of the tractor unit 1, the magnetic stabilizer 23 being located between the rear wall 13 and the spring 15 transversally to the rear wall 13.

As illustrated in FIGS. 6 and 7, the recess 27 is configured to receive a portion of the spring 15 in the uncoupled configuration.

The recess 27 is an axial groove 29 extending according to a longitudinal direction 31 and configured to prevent lateral displacement of the spring 15 in the uncoupled configuration. Lateral is to be understood with respect to the longitudinal direction 31. Usually, the longitudinal direction 31 is vertical or substantially vertical.

The bracket 11 comprises a bar (also known as bracket) 33 on which the spring 15 is hinged so as to freely move along the bar (or bracket) 33. The first extremity 17 comprises a ring 35 or hook configured to be secured on the bar (or bracket) 33.

The system for holding and storing 3 further comprises a second retaining mechanism 36 provided with a plurality of holders 37 configured to be attached on the rear wall 13, each holder 37 being configured to receive a coupling 7 of a corresponding line 5 due to complementary form in the uncoupled configuration.

Each holder 37 is configured to secure the corresponding coupling 7 in the uncoupled configuration.

The plurality of lines 5 comprise two pneumatic hoses. Each pneumatic hose has a coupling 7 that is preferably a glad hand coupling. Glad hand coupling arrangements are well known, that is why such arrangements are not described further herein.

According to the variant of FIG. 7, the magnetic stabilizer 23 comprises an electro-magnet and a switch 39 configured to turn on the electro-magnet, said switch 39 being provided with a manual command or being coupled to the plurality of holders 37 so as to be turned on when every coupling 7 is received on the corresponding holder 37.

This use of an electro-magnet is configured for removing the magnetic constraints on the spring 15 in the coupled configuration. The electro-magnet comprises a coil configured to be powered by the tractor unit 1, in particular from a battery or an auxiliary device (such as an alternator) located in the tractor unit 1.

The system for holding and storing 3 further includes at least one proximity sensor to detect whether the couplings 7 are in a stored configuration in which they are held by the second retaining mechanism 36 and in that the electro-magnet is turned on only when the couplings 7 are in said stored configuration. Thus, a possibility is to implement an automatic mode in which the electro-magnet is automatically switched on depending on proximity sensor readings.

The switch 39 can comprise said proximity sensor configured to sense the couplings 7 positioned in stored configuration or alternatively an open circuit detection device that is open in the absence of the couplings 7. Another alternative is that the switch 39 can be controlled by a software control system of the tractor unit 1, for example following an input from the user or ECUs (electronic control units) available on vehicle.

The magnetic stabilizer 23 comprises an external shell 41. The external shell 41 is made of plastic and in particular of PA66. The coil is housed in said external shell 41.

According to another variant illustrated in FIG. 6, the magnetic stabilizer 23 comprises a permanent magnet.

As illustrated in FIG. 8, each line 5 comprises an inlet connector 43 at an extremity opposed to the extremity comprising the corresponding coupling 7, the inlet connectors 43 being configured to be plugged on a dedicated feeding connector assembly 45 of the tractor unit 1, the holders 37 being located between said feeding connector assembly 45 of the tractor unit 1 and the second extremities 19 so that the lines 5 are arranged according to a looped trajectory in the uncoupled configuration.

The looped trajectory is extending according to a plane sensibly parallel to the rear wall 13 of the tractor unit 1.

The system for holding and storing 3 allows maintaining the spring 15 in the rest position as the tractor unit 1 is driving without being connected to a trailer 4. Even if the road presents an uneven surface, the magnetic stabilizer 23 prevents the moves of the spring 15 to protect the rear wall 13 of the tractor unit 1 against the knocking of the second extremities 19.

Not only the spring 15 is attracted by the magnetic stabilizer 23 in the uncoupled configuration, but also the corresponding recesses 27 define precisely the rest position. Thus, when changing from the coupled configuration to the uncoupled configuration, the spring 15 is attracted to be maintained received in the corresponding recesses 27.

As the spring 15 is attracted toward the magnetic stabilizer 23 and blocked laterally, there is a reliable position maintaining in rest position even if the tractor unit 1 is driving on a difficult road.

This provision allows keeping the plurality of lines 5 near the rear wall 13 in the uncoupled configuration while protecting the rear wall from knockings of the second extremity of the spring 15.

The lines 5 are managed together as a bundle by the at least one second extremity.

It is to be understood that the present invention is not limited to the embodiments described above and illustrated in the drawings; rather, the skilled person will recognize that many changes and modifications may be made within the scope of the appended claims.

What is claimed is:

1. A system for holding and storing disconnected lines of a tractor unit, each line comprising, at one end, a coupling configured to be coupled to a complementary coupling of a trailer so as to pneumatically or electrically connect the trailer to the tractor unit, the system comprising:
    a first retaining mechanism comprising a bracket designed to be fixed on a rear wall of the tractor unit and at least one spring having a first extremity attached to the bracket and a second extremity on which at least one of the lines can be hung; and
    a second retaining mechanism for receiving and holding the couplings arranged at the end of the lines;
    wherein the system further includes a magnetic stabilizer configured for attracting and maintaining the spring in a rest position when the tractor unit is moving without trailer;
        wherein the magnetic stabilizer comprises a body having at least one recess configured to receive a portion of a corresponding spring in the rest position.

2. The system of claim 1, wherein the recess is an axial groove configured to prevent lateral displacement of the corresponding spring in the rest position.

3. The system of claim 1, wherein the second extremity comprises a hooking element to be attached around at least one line.

4. The system of claim 3, wherein the hooking element is configured to cooperate with a plurality of lines.

5. The system of claim 1, wherein the bracket comprises a bar on which the at least one spring is hinged so as to freely move along the bar.

6. The system of claim 1, wherein the second retaining mechanism comprises a plurality of holders configured to be attached on the rear wall, each holder being configured to receive a coupling of a corresponding line.

7. The system of claim 6, wherein the magnetic stabilizer comprises an electro-magnet that can be manually or automatically switched on.

8. The system of claim 7, further including at least one proximity sensor to detect whether the couplings are in a stored configuration in which they are held by the second retaining mechanism and in that the electro-magnet is turned on only when the couplings are in the stored configuration.

9. The system of claim 1, wherein the magnetic stabilizer comprises a permanent magnet.

10. A tractor unit comprising a system for holding and storing disconnected lines of the tractor unit, each line comprising, at one end, a coupling configured to be coupled to a complementary coupling of a trailer so as to pneumatically or electrically connect the trailer to the tractor unit, the system comprising:
   a first retaining mechanism comprising a bracket designed to be fixed on a rear wall of the tractor unit and at least one spring having a first extremity attached to the bracket and a second extremity on which at least one of the lines can be hung; and
   a second retaining mechanism for receiving and holding the couplings arranged at the end of the lines;
   wherein the system further includes a magnetic stabilizer configured for attracting and maintaining the spring in a rest position when the tractor unit is moving without trailer;
   wherein the magnetic stabilizer comprises a body having at least one recess configured to receive a portion of a corresponding spring in the rest position.

11. The tractor unit of claim 10, wherein the recess is an axial groove configured to prevent lateral displacement of the corresponding spring in the rest position.

12. The tractor unit of claim 10, wherein the second extremity comprises a hooking element to be attached around at least one line.

13. The tractor unit of claim 12, wherein the hooking element is configured to cooperate with a plurality of lines.

14. The tractor unit of claim 10, wherein the bracket comprises a bar on which the at least one spring is hinged so as to freely move along the bar.

15. The tractor unit of claim 10, wherein the second retaining mechanism comprises a plurality of holders configured to be attached on the rear wall, each holder being configured to receive a coupling of a corresponding line.

16. The tractor unit of claim 15, wherein the magnetic stabilizer comprises an electro-magnet that can be manually or automatically switched on.

17. The tractor unit of claim 16, further including at least one proximity sensor to detect whether the couplings are in a stored configuration in which they are held by the second retaining mechanism and in that the electro-magnet is turned on only when the couplings are in the stored configuration.

18. The tractor unit of claim 10, wherein the magnetic stabilizer comprises a permanent magnet.

\* \* \* \* \*